United States Patent

Thiesler et al.

[11] 3,847,403
[45] Nov. 12, 1974

[54] SEAL FOR A CONVEYOR AXLE OF A TRAVELING GRATE

[75] Inventors: Ingo Thiesler, Neubeckum; Wilhelm Hackbarth, Ahlen, both of Germany

[73] Assignee: Polysius AG, Neubeckum, Germany

[22] Filed: Sept. 10, 1973

[21] Appl. No.: 395,961

[30] Foreign Application Priority Data
Dec. 5, 1972 Germany............................ 7244485

[52] U.S. Cl. .................................................. 277/57
[51] Int. Cl............................................. F16j 15/44
[58] Field of Search ................ 277/57, 58, 181, 186

[56] References Cited
UNITED STATES PATENTS

| 3,144,280 | 8/1964 | Sorenson | 277/57 |
| 3,338,584 | 8/1967 | Nakanishi et al. | 277/186 |
| 3,563,556 | 2/1971 | Scott | 277/181 |

Primary Examiner—Harry N. Haroian
Assistant Examiner—Robert I. Smith
Attorney, Agent, or Firm—Learman & McCulloch

[57] ABSTRACT

A conveyor axle seal comprises an elastic sealing sleeve connected at one end to a fixed member and at its other end to a packing ring which encircles the axle. The elasticity of the sleeve enables the packing ring and the axle to partake of relative rotary and sliding movements.

4 Claims, 1 Drawing Figure

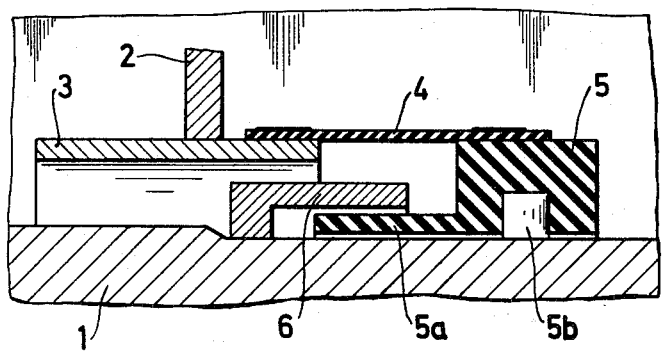

SEAL FOR A CONVEYOR AXLE OF A TRAVELING GRATE

The invention concerns a seal for a conveyor axle rotatably positioned in a stationary casing of a traveling grate.

The chain members of a traveling grate generally rest on conveyor rollers supported by the conveyor axles, the latter being rotatably positioned in the stationary casing of the traveling grate. Within the stationary traveling grate casing, it is necessary to seal the conveyor axle in order to prevent inflow or escape of gas and fine-grained material.

It is old in the art to provide a stuffing box to seal a conveyor axle. However, frequently very high temperatures occur during the operation of a traveling grate, so that the stationary casing of the traveling grate is subjected to considerable thermal stress. Appreciable thermal expansion results, which in turn leads to difficulties, particularly when neighboring construction elements have a different thermal expansion. In the present instance this pertains particularly to the thermally stressed casing (conveyor axle penetration) and the not thermally stressed supporting structure of the conveyor axle bearing. Since known conveyor axle seals in the form of a stuffing box do not permit compensation for different thermal expansions to an extent worth mentioning, the prior art version is subjected to considerable stress caused by the heat, which stress results in an undesirable load on the conveyor axle and the seal. This load causes premature abrasion of the seal; accordingly, satisfactory functioning of the seal is no longer guaranteed.

Therefore, an object of the present invention is to provide a seal for a conveyor axle without these disadvantages, whereby such seal permits substantially 1 stress-free conpensation of the different thermal expansions.

In accordance with the invention, one end of an annular sealing sleeve of elastic material is connected to a stationary casing, and its other end is connected to a sealing or packing ring arranged on the conveyor axle such that the conveyor axle and the packing ring can be moved with respect to each other in a sliding and rotary motion.

Such embodiment permits arbitrary motion in any direction between the conveyor axle and the parts of the stationary casing surrounding it, such motion being effected by differences of thermal expansion, without causing the annoying mechanical forces resulting therefrom. The elastic sealing sleeve absorbs the relative movement of the construction parts subjected to differing thermal stress, without thereby impairing the sealing function.

According to a suitable further improvement of the invention, the packing ring has an annular extension which forms a labyrinth seal together with the bushing affixed to the conveyor axle. It is advantageous to arrange this labyrinth seal within the space enclosed by the sealing sleeve. By efficiently utilizing the space available, it is possible thus to achieve further improvement of the seal between the sealing ring and the conveyor axle.

An embodiment of the invention is illustrated schematically in the drawing.

Conveyor axle 1 belonging to a traveling grate is rotatably positioned with respect to a stationary casing 2 in any suitable manner. Stationary casing 2 supports an annular pipe or housing 3 the ends of which terminate short of the ends of the axle. One end of the housing 3 is fitted into and attached to the inner end of an annular sealing sleeve 4 of elastic material closest to the center of the grate.

The outer end of a sealing sleeve 4 is fitted into and connected to a sealing or packing ring 5 arranged on the conveyor axle 1 such that it can slide on the axle. Furthermore, conveyor axle 1 can also be rotated with respect to packing ring 5. As is shown in the drawing, the housing 3 and the packing ring 5 are of substantially the same outside diameter, and the inside diameter of the sleeve 4 corresponds to such outside diameter. The wall thickness of the sleeve 4 is substantially uniform.

Packing ring 5 has an annular extension 5a, and the axle 1 carries a bushing 6 having a flange or annular part radially spaced from the axle and projecting toward the ring 5. The flange and the extension overlap one another to form a labyrinth seal. Packing ring 5 is furthermore provided with groove 5b for accepting lubricants.

Should different thermal expansions occur with respect to the conveyor axle 1 on the one hand and the stationary casing 2 on the other hand when the grate is in operation, then these elements can move at random with respect to each other; radial motions (in arbitrary direction) are absorbed by the elastic sealing sleeve 4, whereas axial motions cause packing ring 5 to move in the one or other direction with the sealing sleeve 4.

What is claimed is:

1. A seal for a rotary conveyor axle comprises a stationary, annular housing encircling said axle and having at least one end thereof terminating short of the corresponding end of said axle; a packing ring encircling said axle and spaced from said one end of said housing, said housing and said packing ring being of substantially the same outside diameter; and an annular, elastic sealing sleeve of substantially uniform wall thickness and having an inside diameter corresponding substantially to the outside diameter of said housing and said packing ring, said sleeve spanning the space between said housing and said packing ring, said housing being fitted into and secured to one end of said sleeve and said packing ring being fitted into and secured to the other end of said sleeve.

2. A seal according to claim 1 including a bushing carried by said axle and having a part radially spaced from said axle, and an annular extension carried by said packing ring, said part and said extension overlapping one another.

3. A seal according to claim 2 wherein said part of said bushing occupies a position between said extension and said sleeve.

4. A seal according to claim 1 wherein said packing ring has a groove therein for the accommodation of lubricant.

* * * * *